No. 609,019. Patented Aug. 16, 1898.
E. FITZ-G. GIBBS.
LATHE CHUCK.
(Application filed Feb. 6, 1897.)
(No Model.)
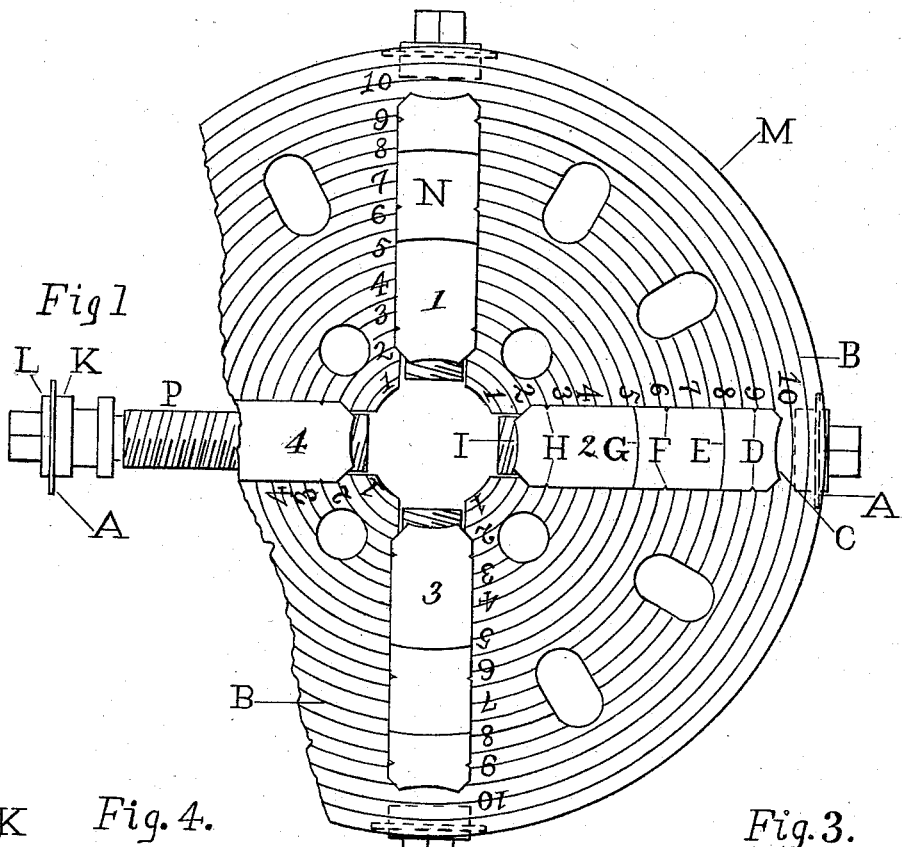
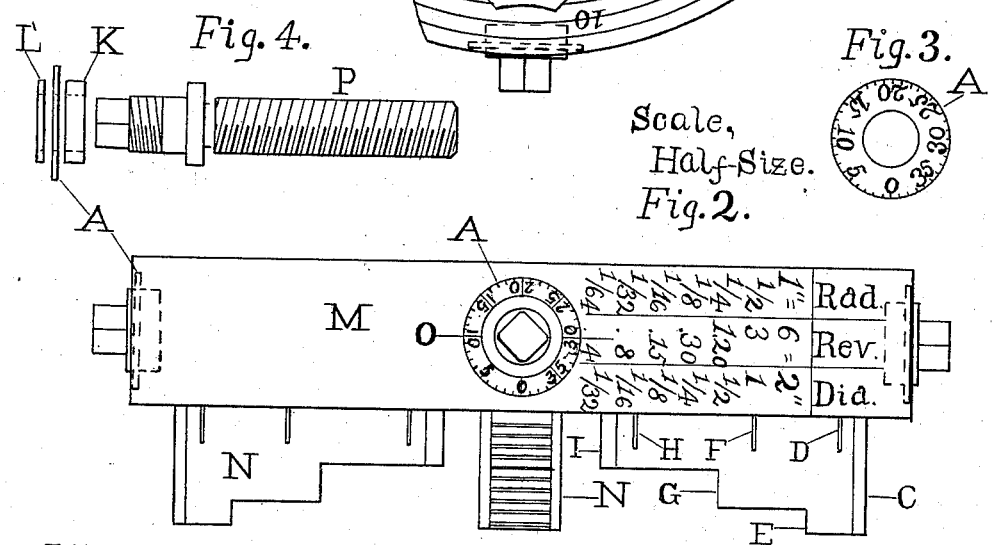
Witnesses
Hale Vauzant Tarrant
Walter Ervin Henley.
Inventor
Edward Fitz-Gerald Gibbs

UNITED STATES PATENT OFFICE.

EDWARD FITZ-GERALD GIBBS, OF BIRMINGHAM, ALABAMA.

LATHE-CHUCK.

SPECIFICATION forming part of Letters Patent No. 609,019, dated August 16, 1898.

Application filed February 6, 1897. Serial No. 622,244. (No model.)

*To all whom it may concern:*

Be it known that I, EDWARD FITZ-GERALD GIBBS, a citizen of the United States, residing at Birmingham, in the county of Jefferson and State of Alabama, have invented certain new and useful Improvements in Lathe-Chucks, of which the following is a specification.

My invention relates to lathe-chucks in which two or more holding-jaws are moved back and forth toward the center by internal screws which project outwardly through the periphery of the chuck; and the object of my invention is to promote despatch and accuracy in adjusting the jaws.

My invention consists in providing a lathe-chuck with a complete system of graduations, indicators, and an indexed table applicable to the same. I attain this object by the mechanism illustrated in the accompanying drawings, in which—

Figure 1 is a front view, and Fig. 2 a top view, of the chuck complete; Fig. 3, one of the several dials A, and Fig. 4 one of the several screws P.

Similar letters and figures refer to similar parts throughout the several views.

The shell or body M, holding in longitudinal position the several screws P, (four in this instance,) each of which engages with and controls one of the several holding-jaws N, constitutes the principal part of the original chuck to which my improvements are applied.

I describe upon the face of the chuck a series of concentric graduated lines B, which are equidistant to each other (not upon a radial line,) upon a line parallel to a radial line, which is traveled by indicators, referred to hereinafter and which coincides with the longitudinal edge of the jaw N and are numbered with reference to the distance between the center of the chuck and the center of the bites of the holding-jaws described hereinafter and as shown in Fig. 1.

The holding-jaws N retain the customary bites or shoulders I G E. Each jaw is provided with marks H F D, which are indicators, one each at a uniform distance from and relating to bites I G E, respectively, and are so arranged that whenever all the indicators of a certain type (H, F, or D) arrive exactly at one of the graduated lines (B) of a certain number then the number of that line indicates the exact number of inches of the diameter of a circle which may be inclosed within the bites referred to by the said indicators.

Around about each screw P at the periphery of the chuck I provide a series of equal degrees or graduations (forty in this instance) and number accordingly. I make also an indicator O, which relates to the said graduations. It is necessary that either the graduations or the indicator should move around with the screw, while the other remains stationary; but it is not material which moves.

I prefer to stamp the graduations upon the dial A, as shown in Fig. 3, and apply with adequate adjustable supports to the screw, stamping the indicator O upon the periphery of the chuck.

The indicators H F D are so spaced with reference to each other that (the screw P being six threads per inch, as in this instance) each half-revolution of the screw brings one and one only of the said indicators upon one of the lines B. Therefore one and one-half revolutions of the said screw moves an indicator just the distance from one of the said lines B to another one-fourth of an inch, or three degrees. This arrangement greatly facilitates speed in getting work true by always having one of the said indicators in close proximity with one of the said lines, having at the same time the fewest number of lines possible, whereas a multiplicity of lines tends to create confusion.

The dial A is so set that whenever zero of the dial arrives at indicator O then one of the indicators H, F, or D stands exactly upon a full-inch line, and whenever number "20" of the dial arrives at O then one of the indicators H, F, or D stands exactly upon a half-inch line. The utility of this combination will be discovered when in chucking work, for instance, the dial of jaw 1 indicates at "5," while the dial of the opposite jaw 3 indicates at "35." Since they must agree before the work is true, the question at once arises with the operator "Should they agree at '20' or '0'?" He is aware without consulting the jaw-indicators that one indicator (H, F, or D) of each jaw is very near a full-inch line, and if the corresponding indicator of each jaw stands near the same concentric full-inch line then the dials should agree at zero; but if a certain indicator of jaw 1 stands near a certain full-inch line while another indicator of jaw 3 stands near any line then the work is radically out of true.

It will be observed that the graduated dial A acts upon the micrometer principle, while the indicators H F D constitute the graduations of both a simple and a compound vernier adapted to and coöperating with graduated lines B, while a simple vernier indicates the position of one movable object with reference to a stationary point. This indicates the position of several movable objects (the bites I G E) with reference to one stationary point, (the chuck-center.) In the present drawings, for instance, the exact positions of bites G and E are known, although neither of their indicators F or D stands near one of the lines B; but as indicator H stands exactly at the two-and-one-half-inch line F must necessarily be between two lines one degree from one and two degrees from the other. By observation it will be seen that it stands between the six and-six-and-one-half inch lines and nearer the former than the latter. Therefore it is understood it indicates at six plus one degree. In like manner it is ascertained that D indicates at eight and one-half plus two degrees.

The indicators H F D are not numbered as the graduations of a vernier usually are because the limited number employed makes it unnecessary and because if numbered they must be numbered with reference to a particular bite, which would confuse the operator if using them to indicate the other bites. For illustration, if bite I is to be indicated then indicator H becomes $o$ of the vernier graduations $D'$ and $F^2$. If bite G is to be indicated, then F becomes $o$, $H'$, and $D^2$, and if bite E is to be indicated then D becomes $o$, $F'$, and $H^2$. These vernier degrees, however, being very coarse (one-twelfth of an inch in this case) I subdivide them accurately by employing the dial A. This feature enables the operator to set two of the jaws accurately for work of known diameter before the work is put in the chuck and also to determine with accuracy the diameter of work in the chuck.

It is almost impossible and inconvenient to chuck work with any great degree of accuracy by the vernier or any system of graduation on the face of the chuck; but it is easily done by the dials. The dials, however, are of but little service until the work is nearly true.

The dial A may be held in adjustable position by simple friction; but it is often convenient and necessary to chuck work from the inside, whereby an inward thrust is produced upon the screws. In order to resist this inward thrust to provide fully against the probability of the dials being moved by accident or violence and to make them conveniently adjustable, I provide additional supports K and L, which I prefer to apply in the form of collars and lock-nuts, as shown in Fig. 1.

In order to determine without calculation or measurement and avoid the risk of errors in calculation the exact number of revolutions and degrees required to be turned upon the screw P, as indicated by the dial A, to move the jaw N any given number of inches or fractional part thereof, I provide an equalizing-table W, as shown in Fig. 2.

Having fully shown and described my improvements, which I declare to be my own invention and desire to secure by Letters Patent therefor, I claim—

1. The combination of a lathe-chuck body, having a series of graduated lines upon its face; with holding-jaws, two or more of which carry vernier graduations which are adapted to and coöperate with the said graduated lines, all substantially as set forth.

2. The combination of a lathe-chuck body having a series of graduated lines upon its face; with holding-jaws, two or more of which carry each a plurality of bites provided with respective indicators which constitute in whole or in part the graduations of a compound vernier, adapted to and coöperating with the graduated lines upon the face of the chuck; all substantially as and for the purposes set forth.

3. The combination of a lathe-chuck body having a series of graduated lines upon its face, and two or more holding-jaws provided with vernier graduations adapted to and coöperating with the said graduated lines upon the face of the chuck; with the jaw's driving-screws, each carrying a graduated dial near its outer end, to the end that the degrees registered by the said vernier are accurately subdivided into degrees of smaller denomination; all substantially as set forth.

4. The combination of a lathe-chuck body, having a series of graduated lines upon its face, spaced and numbered with reference to their function of indicating diameters, jaws having indicators which refer to respective bites adapted to register with said graduated lines; and graduated dials carried by screws, whereby the divisions of the chuck-face graduations are subdivided, to the end that diameters of work may be provided for and determined quickly and with minute accuracy; all substantially as set forth.

5. In a lathe-chuck, the combination of the chuck-body, a holding-jaw movable thereon, a driving-screw arranged to move the jaw, a graduated dial mounted on the screw near its outer end, and a collar on the driving-screw between the dial and body, substantially as set forth.

6. In a lathe-chuck, the combination of the chuck-body, a holding-jaw movable thereon, a driving-screw arranged to move the jaw, a graduated dial mounted on the screw near its outer end, and a lock-nut arranged on the screw outside the dial to reinforce, lock and protect the dial in adjustable position, substantially as set forth.

7. In a lathe-chuck, the combination of the chuck-body, holding-jaws movable thereon, driving-screws arranged to move the jaws, graduated dials mounted on said screws near their outer ends, and means carried by screws to hold and protect said dials in adjustable position, said means comprising two supports between which the dial is held, substantially as set forth.

8. The combination of a lathe-chuck body having an equalizing-table adapted to the pitch of the threads of the jaw's driving-screw and to the graduations of the graduated dial carried by the said screw; with the said driving-screw and graduated dial; all substantially as set forth and for the purpose indicated.

EDWARD FITZ-GERALD GIBBS.

Witnesses:
   HALE VANZANT TARRANT,
   WALTER ERVIN HENLEY.